(12) United States Patent
Tamamura et al.

(10) Patent No.: US 11,661,370 B2
(45) Date of Patent: May 30, 2023

(54) METHOD FOR MANUFACTURING BELT-SHAPED GLASS AND DEVICE FOR MANUFACTURING BELT-SHAPED GLASS

(71) Applicant: Nippon Electric Glass Co., Ltd., Shiga (JP)

(72) Inventors: Shusaku Tamamura, Shiga (JP); Koichi Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 178 days.

(21) Appl. No.: 16/771,330

(22) PCT Filed: Oct. 31, 2018

(86) PCT No.: PCT/JP2018/040449
§ 371 (c)(1),
(2) Date: Jun. 10, 2020

(87) PCT Pub. No.: WO2019/116762
PCT Pub. Date: Jun. 20, 2019

(65) Prior Publication Data
US 2020/0339464 A1     Oct. 29, 2020

(30) Foreign Application Priority Data
Dec. 11, 2017   (JP) .............................. JP2017-236968

(51) Int. Cl.
*C03B 35/16*     (2006.01)
*B65H 20/10*     (2006.01)
(Continued)

(52) U.S. Cl.
CPC ............ *C03B 35/16* (2013.01); *B65H 20/10* (2013.01); *B65H 23/038* (2013.01); *C03B 17/06* (2013.01); *C03B 25/00* (2013.01)

(58) Field of Classification Search
None
See application file for complete search history.

(56) References Cited

U.S. PATENT DOCUMENTS

| 2010/0242546 A1 | 9/2010 | Tsuji et al. |
| 2011/0177290 A1 | 7/2011 | Tomamoto et al. |

(Continued)

FOREIGN PATENT DOCUMENTS

| EP | 3533771 A1 * | 9/2019 | ............ B29C 65/48 |
| JP | 2009-107911 | 5/2009 | |

(Continued)

OTHER PUBLICATIONS

JP 2016113342 machine translation, Mori et al., Production method of glass film, Jun. 2016 (Year: 2016).*

(Continued)

*Primary Examiner* — Queenie S Dehghan
(74) *Attorney, Agent, or Firm* — Wenderoth, Lind & Ponack, L.L.P.

(57) ABSTRACT

A manufacturing method for a band-shaped glass includes a forming step, which forms a band-shaped glass, an annealing step, which performs an annealing treatment on the band-shaped glass, a cooling step, which cools the annealed band-shaped glass, a direction-changing step, which changes a feeding direction of the cooled band-shaped glass from a longitudinal direction to a horizontal direction, and a horizontal conveying step, which conveys the band-shaped glass in the horizontal direction while supporting the band-shaped glass at a horizontal conveyance part. In the horizontal conveying step, the band-shaped glass is conveyed in the horizontal direction while a first propulsion for driving the conveyance in the horizontal direction is provided at both sides in the width direction of the band-shaped glass by the horizontal conveyance part, the first propulsion being (Continued)

larger than a second propulsion provided at a center in the width direction of the band-shaped glass.

7 Claims, 3 Drawing Sheets

(51) Int. Cl.
*B65H 23/038* (2006.01)
*C03B 17/06* (2006.01)
*C03B 25/00* (2006.01)

(56) References Cited

U.S. PATENT DOCUMENTS

| | | |
|---|---|---|
| 2012/0024929 A1 | 2/2012 | Teranishi et al. |
| 2014/0137602 A1 | 5/2014 | Tamamura et al. |
| 2014/0319001 A1 | 10/2014 | Tomamoto et al. |

FOREIGN PATENT DOCUMENTS

| | | | |
|---|---|---|---|
| JP | 2010-132347 | 6/2010 | |
| JP | 2012-25624 | 2/2012 | |
| JP | 2013-133246 | 7/2013 | |
| JP | 2015-44710 | 3/2015 | |
| JP | 2016-113342 | 6/2016 | |
| WO | WO-2018079343 A1 * | 5/2018 | ............. B29C 65/48 |

OTHER PUBLICATIONS

International Preliminary Report on Patentability and Written Opinion of the International Searching Authority dated Jun. 16, 2020 in International (PCT) Patent Application No. PCT/JP2018/040449.
International Search Report dated Feb. 5, 2019 in International (PCT) Application No. PCT/JP2018/040449.
Notice of Reasons for Refusal dated Jul. 20, 2021 in corresponding Japanese Patent Application No. 2017-236968, with English Translation.

* cited by examiner

METHOD FOR MANUFACTURING BELT-SHAPED GLASS AND DEVICE FOR MANUFACTURING BELT-SHAPED GLASS

TECHNICAL FIELD

The present invention relates to a manufacturing method for a band-shaped glass and a manufacturing device for a band-shaped glass, in particular, to a technology of forming a band-shaped glass by, for example, an overflow down-draw method and thereafter changing a feeding direction of the band-shaped glass from a longitudinal direction to a horizontal direction.

BACKGROUND ART

As is widely known, with regard to a glass sheet to be used for a flat panel display (FPD) such as a liquid crystal display, a plasma display, and an OLED display, reduction in thickness of the glass sheet has been promoted along with an increasing demand for reduction in weight. A glass film having a thickness reduced to 300 μm or less, or 200 μm or less, has been developed and manufactured.

Those film-shaped glasses (band-shaped glasses) can be manufactured by a manufacturing method for a band-shaped glass, as represented by an overflow down-draw method, including a forming step of forming a band-shaped glass, an annealing step of performing an annealing treatment on the formed band-shaped glass while lowering the band-shaped glass, a cooling step of cooling the band-shaped glass having been subjected to the annealing treatment, a direction-changing step of changing a feeding direction of the band-shaped glass having been cooled from a longitudinal direction to a horizontal direction, and a horizontal conveying step of conveying the band-shaped glass having been changed in direction in the horizontal direction. As described above, the feeding direction of the band-shaped glass is changed to the horizontal direction after the annealing step and the cooling step, and hence there is an advantage in that subsequent processing (for example, cutting and winding) to the band-shaped glass becomes easier.

However, when such a manufacturing method described above is adopted, due to the thinness of the band-shaped glass (due to the small thickness dimension of the band-shaped glass), various external factors may cause curved deformation, specifically, cause protrusion on one of a front surface side and a back surface side and recess on another one of the front surface side and the back surface side during the lowering, and directions of the curved deformation (directions of the protrusion and the recess) may further be changed within a short period. As described above, when a posture of the band-shaped glass is unstable during the lowering, a posture of the band-shaped glass introduced during the direction-changing step is also not stable, and the posture given at this time may cause stress concentration on the band-shaped glass, which may result in breakage of the band-shaped glass. This type of breakage causes a long-term stop of a production line, and a long period of time is required for restarting the production line, with the result that productivity of the band-shaped glass is degraded.

Thus, as a measure for solving the problem described above, the applicant of the present invention has proposed a manufacturing method and a manufacturing device described in Patent Literature 1. In Patent Literature 1, the following features are described. A band-shaped glass is introduced to the direction-changing step under a state in which the curved deformation of the band-shaped glass is caused so that, of a first main surface and a second main surface corresponding respectively to a front surface and a back surface of the band-shaped glass, the first main surface facing upward in the horizontal conveying step is recessed along a width direction. Further, in order to cause the curved deformation to the band-shaped glass so that the first main surface of the band-shaped glass is recessed along the width direction, a temperature difference is given between the both surfaces of the band-shaped glass at the time of forming the band-shaped glass.

As described above, at the time of introducing the band-shaped glass to the direction-changing step, when a curved shape in which the first main surface is recessed in the width direction is intentionally given, the stress concentration that occurs on the band-shaped glass during the change in direction can be suppressed. Therefore, even when the band-shaped glass is bent for the change in direction, the breakage of the band-shaped glass caused by the bending can be prevented as much as possible.

CITATION LIST

Patent Literature 1: JP 2013-133246 A

SUMMARY OF INVENTION

Technical Problem

However, as disclosed in Patent Literature 1, in order to give the temperature difference between both surfaces of the band-shaped glass at the time of forming the band-shaped glass, a precise temperature adjustment is required. Therefore, there has been a problem in that operation becomes cumbersome.

In the view of the above-mentioned circumstances, the present invention has been made in order to achieve a technical object of preventing occurrence of curved deformation in an unfavorable orientation during a manufacturing process in a manner easier than related-arts, to thereby preventing breakage of a band-shaped glass.

Solution to Problem

The object described above can be achieved with a manufacturing method for a band-shaped glass according to the present invention. That is, there is provided a manufacturing method for a band-shaped glass, comprising: a forming step of forming a band-shaped glass; an annealing step of performing an annealing treatment on the band-shaped glass; a cooling step of cooling the band-shaped glass having been subjected to the annealing treatment; a direction-changing step of changing a feeding direction of the band-shaped glass having been cooled from a longitudinal direction to a horizontal direction; and a horizontal conveying step of conveying the band-shaped glass having been changed in direction in the horizontal direction while supporting the band-shaped glass at a horizontal conveyance part, wherein, in the horizontal conveying step, the band-shaped glass is conveyed in the horizontal direction while a first propulsion for driving a conveyance in the horizontal direction is given to both sides in a width direction of the band-shaped glass by the horizontal conveyance part, and wherein the first propulsion is set larger than a second propulsion for driving conveyance in the horizontal direction given to a center in the width direction of the band-shaped glass.

The "horizontal direction" used in the description is a concept including a horizontal direction and a direction forming a certain angle with respect to the horizontal direction. Similarly, the "longitudinal direction" is a concept including a vertical direction and a direction forming a certain angle with respect to the vertical direction.

Furthermore, "both sides in width direction" used in the description corresponds to a region extending from each of both end positions of the band-shaped glass in the width direction and falling within a range of 5% or more and 10% or less with respect to an overall dimension of the band-shaped glass in the width direction. In the description, "center in width direction" corresponds to a region of the band-shaped glass other than both sides in the width direction.

As described above, according to the manufacturing method for a band-shaped glass according to the present invention, with the focus given not on the time of lowering the band-shaped glass but on the horizontal direction conveyance after the change in direction, the band-shaped glass is conveyed in the horizontal direction while the first propulsion for driving the horizontal direction conveyance is given to both sides in the width direction of the band-shaped glass by the horizontal conveyance part, and the first propulsion is set larger than the second propulsion for driving the horizontal direction conveyance given to the center in the width direction of the band-shaped glass by the horizontal conveyance part. In this manner, the curved deformation in an unfavorable orientation of the band-shaped glass introduced to the direction-changing step can be prevented by distributing a force for driving the conveyance in the horizontal direction given to the band-shaped glass by the horizontal conveyance part in the width direction in a predetermined mode. In addition, when it comes to a conveyance propulsion in the horizontal direction given to the band-shaped glass by the horizontal conveyance part, a distribution in the width direction can be adjusted relatively easily by simply changing, for example, a support mode and a structure for the horizontal conveyance part. As described above, according to the manufacturing method of the present invention, the breakage of the band-shaped glass can be prevented as much as possible by effectively suppressing the stress concentration that occurs on the band-shaped glass during the change in direction.

Further, in the manufacturing method for a band-shaped glass of the present invention, the second propulsion may be substantially zero.

As described above, when the second propulsion given to the center in the width direction of the band-shaped glass by the horizontal conveyance part is set to substantially zero, the first propulsion given to both sides in the width direction of the band-shaped glass by the horizontal conveyance part can be set larger by that amount. Thus, even without an increase in conveyance propulsion in the horizontal direction, a width direction distribution of the propulsion (distribution load in the width direction serving as the propulsion) that is effective for preventing the curved deformation can be given to the band-shaped glass, thereby being capable of reliably preventing the curved deformation in the unfavorable orientation of the band-shaped glass introduced to the direction-changing step.

Further, in the manufacturing method for a band-shaped glass of the present invention, the horizontal conveyance part may be a floating type conveyor belt, which causes at least a part of the band-shaped glass in the width direction to float from a belt by jetting an air upward from a hole portion that is opened on the belt, and no hole portion is formed at a portion of the belt in contact with both sides in the width direction of the band-shaped glass. The "no hole portion" used in the description includes not only a case in which the hole portion capable of jetting an air is not formed in the belt but also a case in which the hole portion is closed so that the air cannot be jetted.

As described above, when the horizontal conveyance part is a floating type conveyor belt, the main surface of the band-shaped glass, in particular, the center in the width direction corresponding to a quality guarantee surface can be conveyed in the horizontal direction under a state in which the center in the width direction floats above the conveyor belt. Meanwhile, at a portion of the belt in contact with both sides in the width direction of the band-shaped glass, a structure having no hole portion for jetting gas is adopted so that both sides in the width direction of the band-shaped glass is reliably in contact with the belt. Therefore, while the band-shaped glass is conveyed in the horizontal direction in a flat posture without a curve as a whole, the conveyance propulsion (first propulsion) in the horizontal direction with respect to both sides in the width direction of the band-shaped glass can be reliably given. In such a manner, the above-mentioned conveyance propulsion can easily be distributed in the width direction in a desired manner.

In addition, as described above, when the horizontal conveyance part is a floating type conveyor belt, with regard to the manufacturing method for a band-shaped glass according to the present invention, a tape is attached to a part of the belt in contact with the both sides in the width direction of the band-shaped glass, and a hole portion in the portion in contact with both sides in the width direction may be closed by the tape.

With the configuration described above, while using the floating type conveyor belt having a structure comprising the hole portion for jetting gas over the entire belt, a structure that only both sides in the width direction do not have the hole portion can be adopted so that the above-mentioned conveyance propulsion can be significantly easily distributed in the width direction in the desired manner. Further, with regard to the portion of the belt to which the tape is attached, a support position for the band-shaped glass becomes higher by the thickness dimension of the tape, and hence it becomes easier to support on both sides in the width direction while floating the center in the width direction of the band-shaped glass.

Furthermore, when the tape is attached as described above, in the manufacturing method for a band-shaped glass according to the present invention, a tape having a higher frictional force with respect to the band-shaped glass than the belt may be used.

As described above, through the use of the tape having a higher frictional force with respect to the band-shaped glass than the belt, larger conveyance propulsion (first propulsion) can be given to both sides in the width direction of the band-shaped glass. In addition, when the frictional force having a certain magnitude is generated, a variation in the conveyance propulsion (first propulsion) given on one side and another side in the width direction is more likely to be small. Further, in this case, a belt made of a material having a small frictional force (easy to slide) with respect to the band-shaped glass can be used as the belt, and hence even when the center in the width direction of the band-shaped glass, which is assumed to be the quality guarantee surface, comes into contact with the belt, a risk of damaging the contacted surface is low.

Further, in the manufacturing method for a band-shaped glass of the present invention, the horizontal conveyance part may comprise the floating type conveyor belt and a nipping roller, which is located above the floating type conveyor belt and is configured to nip both sides in the width direction of the band-shaped glass with the belt.

As described above, when the floating type conveyor belt having no hole portion for jetting gas at the part thereof in the width direction and the nipping roller configured to nip both sides in the width direction of the band-shaped glass with the belt of the conveyor belt are provided to the horizontal conveyance part, a larger conveyance propulsion (first propulsion) can be given to both sides in the width direction of the band-shaped glass. Thus, the curved deformation in the above-mentioned unfavorable orientation of the band-shaped glass can be more reliably prevented. As a matter of course, there is no need to worry about hindering a smooth conveyance of the band shape glass in the horizontal direction because the band-shaped glass is nipped by the conveyor belt and the roller.

Further, when the horizontal conveyance part comprises the nipping roller, in the manufacturing method for a band-shaped glass according to the present invention, with a tape being attached to a portion of the belt of the floating type conveyor belt in contact with both sides in the width direction of the band-shaped glass, both sides in the width direction of the band-shaped glass may be pressed with the nipping roller from above the tape, to thereby nip both sides in the width direction of the band-shaped glass may with the nipping roller and the belt through intermediation of the tape.

As described above, with the structure of nipping both sides in the width direction of the band-shaped glass with the nipping roller and the belt through the tape, both sides in the width direction of the band-shaped glass can be nipped more firmly. Accordingly, larger conveyance propulsion (first propulsion) can be given to both sides in the width direction of the band-shaped glass, thereby being capable of more reliably preventing the curved deformation in the above-mentioned unfavorable orientation of the band-shaped glass.

Further, when the horizontal conveyance part comprises the nipping roller, in the manufacturing method for a band-shaped glass according to the present invention, the band-shaped glass may comprise a flat portion having a constant thickness dimension in the width direction, the thickness dimension comprising the center in the width direction, and an edge portion which is located on an outer side in the width direction of the flat portion and has a thickness dimension larger than that of the flat portion, and wherein a region of both sides in the width direction of the band-shaped glass in which the edge portion is excluded is nipped with the nipping roller and the belt.

As described above, when the band-shaped glass comprises the edge portion corresponding to a thick portion on both sides in the width direction (outer sides in the width direction of a flat portion), it is preferred that a region on the both sides in the width direction other than the edge portion, in other words, a region which is on an inner side in the width direction with respect to the edge portion be nipped by the nipping roller and the belt. Through the nipping in this manner, as compared to a case in which the edge portion that the thickness dimension thereof is not stable is nipped, a nipping condition of the band-shaped glass becomes more stable. Therefore, a magnitude of the first propulsion given to the band-shaped glass by nipping can be stabilized, thereby being capable of more stably and reliably preventing the curved deformation in the above-mentioned unfavorable orientation.

Furthermore, the above-mentioned object is achieved also with a manufacturing device for a band-shaped glass according to a first aspect of the present invention. That is, there is provided a manufacturing device for a band-shaped glass, comprising: a forming part configured to form a band-shaped glass; an annealing treatment part configured to perform an annealing treatment on the band-shaped glass; a cooling part configured to cool the band-shaped glass having been subjected to the annealing treatment; a direction changing part configured to change a feeding direction of the band-shaped glass having been cooled from a longitudinal direction to a horizontal direction; and a horizontal conveyance part configured to convey the band-shaped glass having been changed in direction in the horizontal direction while supporting the band-shaped glass having been changed in direction, wherein the horizontal conveyance part comprises a floating type conveyor belt, which causes at least a part of the band-shaped glass in the width direction to float above a belt by jetting an air upward from a hole portion that is opened on a surface of the belt, and wherein a portion of the floating type conveyor belt in contact with both sides in the width direction of the band-shaped glass has no hole portion.

As described above, when the horizontal conveyance part is a floating type conveyor belt, the center in the width direction of the band-shaped glass can be conveyed in the horizontal direction under a state in which the center in the width direction floats above the conveyor belt. Meanwhile, a structure having no hole portion for jetting gas is adopted at a portion of the belt in contact with both sides in the width direction of the band-shaped glass, and hence both sides in the width direction of the band-shaped glass reliably come into contact with the belt. Therefore, under a state in which a force (second propulsion) for driving the conveyance in the horizontal direction given to the center in the width direction of the band-shaped glass is set to substantially zero, the band-shaped glass can be conveyed in the horizontal direction while a force (first propulsion) corresponding to the force for driving conveyance in the horizontal direction is given to both sides in the width direction of the band-shaped glass. Thus, the first propulsion given to both sides in the width direction of the band-shaped glass can be set larger than the second propulsion given to the center in the width direction of the band-shaped glass by the horizontal conveyance part. As described above, the above-mentioned conveyance propulsion given to the band-shaped glass by the horizontal conveyance part can be distributed in the width direction in the predetermined manner, and thus, similarly to the manufacturing method for a band-shaped glass according to the present invention, the curved deformation in the unfavorable orientation of the band-shaped glass introduced to the direction-changing step can be prevented. In addition, through simple adjustment of a structure of the belt, a distribution in the width direction of the conveyance propulsion in the horizontal direction given to the band-shaped glass by the horizontal conveyance part is adjusted, and hence the curved deformation can be prevented more easily than the related-art. As described above, according to the manufacturing method of the present invention, the breakage of the band-shaped glass can be prevented as much as possible while the stress concentration that occurs on the band-shaped glass during the change in direction is suppressed easily and effectively.

Further, in the manufacturing device for a band-shaped glass of the present invention, a tape is attached to a portion of the belt in contact with both sides in the width direction of the band-shaped glass, and a hole portion in the portion in contact with both sides in the width direction may be closed by the tape.

With the configuration described above, while using the floating type conveyor belt having a structure comprising the hole portion for jetting gas over the entire region of the belt, a structure in which only both sides in the width direction have no hole portion can be adopted, and hence the above-mentioned conveyance propulsion can be distributed significantly easily in the width direction in a desired manner. Further, with regard to the portion of the belt, in which the tape is attached thereto, the support position for the band-shaped glass becomes higher by the thickness dimension of the tape, and hence it becomes easier to support on both sides in the width direction while floating the center in the width direction of the band-shaped glass.

Advantageous Effects of Invention

As described above, according to the present invention, the occurrence of the curved deformation in the unfavorable orientation during the manufacturing process can be prevented in a manner easier than the related-art, thereby being capable of preventing the breakage of the band-shaped glass.

DESCRIPTION OF EMBODIMENTS

In the following, description is made of a first embodiment of the present invention with reference to FIG. 1 to FIG. 4. In this embodiment, description is made below of an example case in which a band-shaped glass is formed from a molten glass by an overflow down-draw method.

Figure 1:
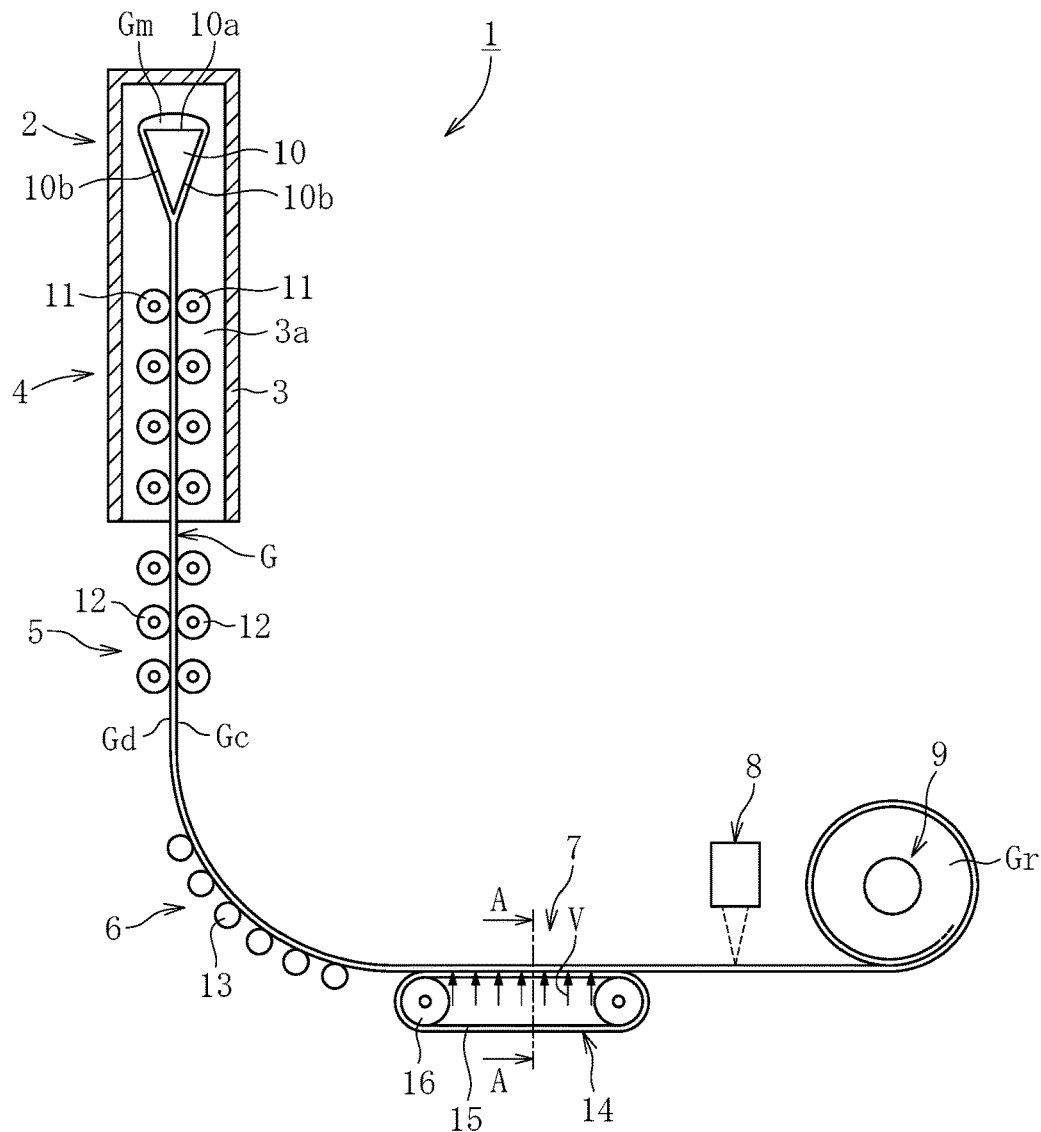
FIG. 1 is a longitudinal sectional view of a manufacturing device for a band-shaped glass according to a first embodiment of the present invention.

FIG. 1 is a longitudinal sectional view of a manufacturing device 1 for a band-shaped glass according to the first embodiment of the present invention. This manufacturing device 1 is configured to form a band-shaped glass G from a molten glass Gm by the so-called overflow down-draw method. The manufacturing device 1 mainly comprises a forming part 2, an annealing treatment part 4, a cooling part 5, a direction changing part 6, and a horizontal conveyance part 7. The forming part 2 is configured to obtain the band-shaped glass G by forming the molten glass Gm into a band shape. The annealing treatment part 4 is configured to perform an annealing treatment on the band-shaped glass G in an annealing furnace 3. The cooling part 5 is configured to cool the band-shaped glass G having been subjected to the annealing treatment to a predetermined temperature, for example, to a temperature close to a room temperature. The direction changing part 6 is configured to change a feeding direction of the band-shaped glass G having been cooled from a vertical direction to a horizontal direction. The horizontal conveyance part 7 is configured to convey the band-shaped glass G in the horizontal direction while supporting the band-shaped glass G having been changed in direction. In this embodiment, the manufacturing device 1 for a band-shaped glass further comprises a take-up part 8 and a cutting part 9. The take-up part 8 is configured to take up the band-shaped glass G having been conveyed in the horizontal direction into a roll shape. The cutting part 9 is located on an upstream side in the conveyance direction of the band-shaped glass G with respect to the take-up part 8, and is configured to cut the band-shaped glass G along a width direction of the band-shaped glass G. In the following, description of the horizontal conveyance part 7 is mainly made in detail.

The forming part 2 has a forming body 10 having an outer surface shape as a substantially wedge-shape in cross section. A glass (molten glass Gm) having been melted in a melting furnace (not shown) is supplied to the forming body 10, and the molten glass Gm pours out from a top portion 10a of the forming body 10. Further, the molten glass Gm having been poured out merges at a lower end through both side surfaces 10b each having a wedge-shaped cross section of the forming body 10 to form the band-shaped glass G from the molten glass Gm.

The annealing treatment part 4 mainly comprises the annealing furnace 3 and is provided to a bottom portion of the forming part 2. An internal space 3a of the annealing furnace 3 has a predetermined temperature gradient in the feeding direction of the band-shaped glass G in the annealing furnace 3, that is, along a downward direction. The internal space 3a of the annealing furnace 3 is configured to anneal the band-shaped glass G passing through the internal space 3a so that the temperature of the band-shaped glass G becomes lower as the band-shaped glass G moves toward a downstream side in the feeding direction. Through annealing, an internal strain can be eliminated. In addition, although not illustrated, the temperature gradient of the internal space 3a can be appropriately set by a temperature adjustment device such as a heating device provided on an inner surface of the annealing furnace 3.

Further, in the annealing treatment part 4 (in the annealing furnace 3), one or a plurality of pairs of rollers 11, which are capable of abutting on the band-shaped glass G from both surface sides, are provided. In this embodiment, four pairs of the rollers 11 are arranged in a lower region of the forming body 10 arranged in the annealing furnace 3. The one or plurality of pairs of rollers 11 have a function of, for example, restricting a contraction in the width direction while cooling the band-shaped glass G and allowing the band-shaped glass G to extend downward. Similarly, in this embodiment, one or a plurality of pairs of rollers 12 (three pairs in the illustrated example), which are capable of abutting on the band-shaped glass G from both surface sides, are provided. The one or plurality of pairs of rollers 12 have a function of assisting the feeding (conveyance) in, for example, a downward direction of the band-shaped glass G.

The direction changing part 6 comprises a plurality of rollers 13, which are arranged along the feeding direction (in this case, a path having a substantially arc shape in side view) of the band-shaped glass G. Some or all of the plurality of rollers 13 are brought into abutment against the band-shaped glass G. Furthermore, each roller 13 may extend over the entire region of the band-shaped glass G in the width direction, or a dimension and a position in a longitudinal direction may be set so as to be brought into abutment against a part of the region in the width direction.

Figure 2:
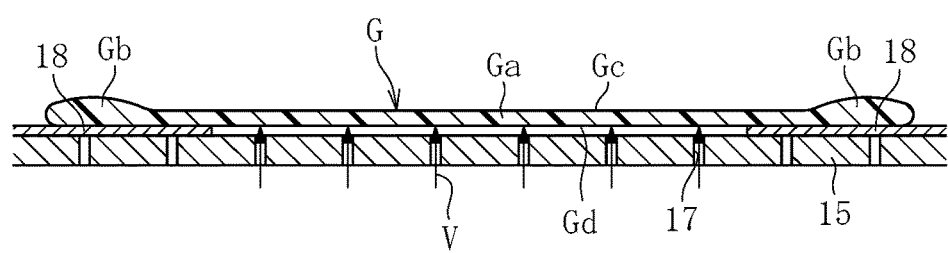
FIG. 2 is a main-part sectional view for illustrating the manufacturing device illustrated in FIG. 1, taken along the line A-A of FIG. 1.

The horizontal conveyance part 7 is configured to support the band-shaped glass G having been changed in direction in the horizontal direction by the direction changing part 6 and to convey the band-shaped glass G in the horizontal direction. In this embodiment, the horizontal conveyance part 7 is formed of a floating type conveyor belt 14, which is configured to support at least both sides in the width direction of the band-shaped glass G. This conveyor belt 14 comprises an endless belt 15 and driving rollers 16. The driving rollers 16 are configured to drive the endless belt 15. Further, in the endless belt 15, as illustrated in FIG. 2, a large number of hole portions 17 are opened, and an air V is jetted upward so as to be supplied from an air supply device (not shown) arranged on an inner periphery of the endless belt 15. Accordingly, the air V can be jetted upward so as to be supplied on the endless belt 15 through the hole portions 17.

Furthermore, on both sides in the width direction of an outer surface of the endless belt 15, tapes 18 are attached in an endless manner. As a result, both sides in the width direction of the band-shaped glass G having been introduced on the conveyor belt 14 come into contact with the tapes 18 (see FIG. 2). The hole portions 17, which are provided on both sides in the width direction of the endless belt 15 of the plurality of hole portions 17, which are provided to the endless belt 15, are closed by the tapes 18. Therefore, on both sides in the width direction (see FIG. 2) of the band-shaped glass G in contact with the tapes 18, a buoyancy by injection and supply of the air V does not act.

In addition, a suitable type of tape can be used for the tapes 18, and it is preferred that its material (in particular, material of a surface), its thickness, and the like be selected in consideration of, for example, a frictional force with the band-shaped glass G. For example, a tape having a higher frictional force with respect to the band-shaped glass G than the endless belt 15 is used. Alternatively, a tape having excellent heat resistance (than the endless belt 15) is used. As a tape which satisfies those characteristics, a glass fiber tape can be given. Further, in this embodiment, two tapes 18 and 18 are attached on both sides in the width direction of the endless belt 15 (see FIG. 2). Those two tapes 18 and 18 may be of the same types, or may be of different types. In short, as described later, as long as a magnitude of forces (first propulsions F1 and F1' illustrated in FIG. 3) for driving the conveyance in the horizontal direction given to both sides in the width direction of the band-shaped glass G by the conveyor belt 14 are equal to each other, the tapes 18 and 18 are freely selected.

Next, an example of the manufacturing method for a band-shaped glass G using the manufacturing device 1 having the above-mentioned configuration is described along with actions and effects of the present invention.

First, in the forming body 10 provided inside the forming part 2, which is located at an uppermost portion of the manufacturing device 1 for a band-shaped glass, a glass (molten glass Gm) which is melted in the melting furnace (not shown) is supplied. With this, as illustrated in FIG. 1, the molten glass Gm is poured out from the top portion 10*a* of the forming body 10 and merges at the lower end through both side surfaces 10*b* each having a wedge-shaped cross section of the forming body 10, and hence the band-shaped glass G having a band-shaped molten glass Gm is formed (forming step).

The band-shaped glass G having been formed by the forming part 2 directly flows downward and reaches the annealing furnace 3 of the annealing treatment part 4 located at the bottom portion of the forming part 2. Then, the band-shaped glass G is annealed while traveling in the internal space 3*a* of the annealing furnace 3 along the predetermined feeding direction (in this case, the downward direction), and a residual strain is eliminated (annealing step).

Further, during the annealing step, the band-shaped glass G is continuously fed in the downward direction by one or plurality of pairs of rollers 11 arranged at the internal space 3*a* of the annealing furnace 3. At this time, the one or plurality of pairs of rollers 11 cause, for example, the band-shaped glass G to extend downward while cooling the band-shaped glass G and restricting the contraction in the width direction. As a result, the band-shaped glass G having gone through the annealing step (alternatively, even the cooling step), as illustrated in FIG. 2, comprises a flat portion G*a* and edge portions G*b*. The flat portion G*a* has a constant thickness dimension including a center in the width direction in the width direction. The edge portions G*b* are each located on the outer side in the width direction of the flat portion G*a* and have a thickness dimension larger than that of the flat portion G*a*.

At this time, the thickness dimension of the flat portion G*a* of the band-shaped glass G is, for example, 300 μm or less, preferably 200 μm or less, more preferably 100 μm or less. In addition, a width direction dimension of the band-shaped glass G is, for example, 4,000 mm or less, preferably 3,000 mm or less, more preferably 2,000 mm or less.

The band-shaped glass G thus obtained is introduced to the direction changing part 6, and while being supported by a part or all of the plurality of rollers 13 forming the direction changing part 6, after changing the feeding direction, the band-shaped glass G is conveyed to the horizontal conveyance part 7 (direction-changing step). Specifically, as illustrated in FIG. 1, the band-shaped glass G is conveyed by the plurality of rollers 13 along the longitudinal direction while being curved with a predetermined curvature. With this, the feeding direction of the band-shaped glass G is changed from the longitudinal direction to the horizontal direction (from the vertical direction to the horizontal direction in the illustrated example).

Furthermore, when the band-shaped glass G having been changed in the feeding direction to the horizontal direction is introduced on the conveyor belt 14 serving as the horizontal conveyance part 7, the first propulsions F1 and F1' (see FIG. 3) as forces for driving the conveyance in the horizontal direction to at least both sides in the width direction of the band-shaped glass G is given from the conveyor belt 14. Accordingly, the band-shaped glass G is continuously conveyed in the horizontal direction (horizontal conveying step).

In addition, in this embodiment, a large number of hole portions 17 are opened in the endless belt 15 of the belt conveyor 14 so as to be capable of jetting and supplying the air V upwardly through the endless belt 15. Therefore, when the band-shaped glass G is introduced on the belt conveyor 14, the predetermined air V is jetted and supplied to the band-shaped glass G that is on the endless belt 15 by the air supply device (not shown) through the hole portions 17. At this time, the tapes 18 and 18 are attached to both sides in the width direction of the endless belt 15, and hence the air V is jetted upwardly and supplied with respect to the flat portion Ga of the band-shaped glass G through the hole portions 17 provided to a region of the endless belt 15, in which the tapes 18 and 18 are not attached (see FIG. 2). Accordingly, under a state in which the center in the width direction (in this case, a part of the flat portion Ga) of the band-shaped glass G floats above the endless belt 15, both sides in the width direction of the band-shaped glass G including the edge portions Gb are supported by the conveyor belt 14, and the band-shaped glass G is conveyed in the horizontal direction.

Figure 4:
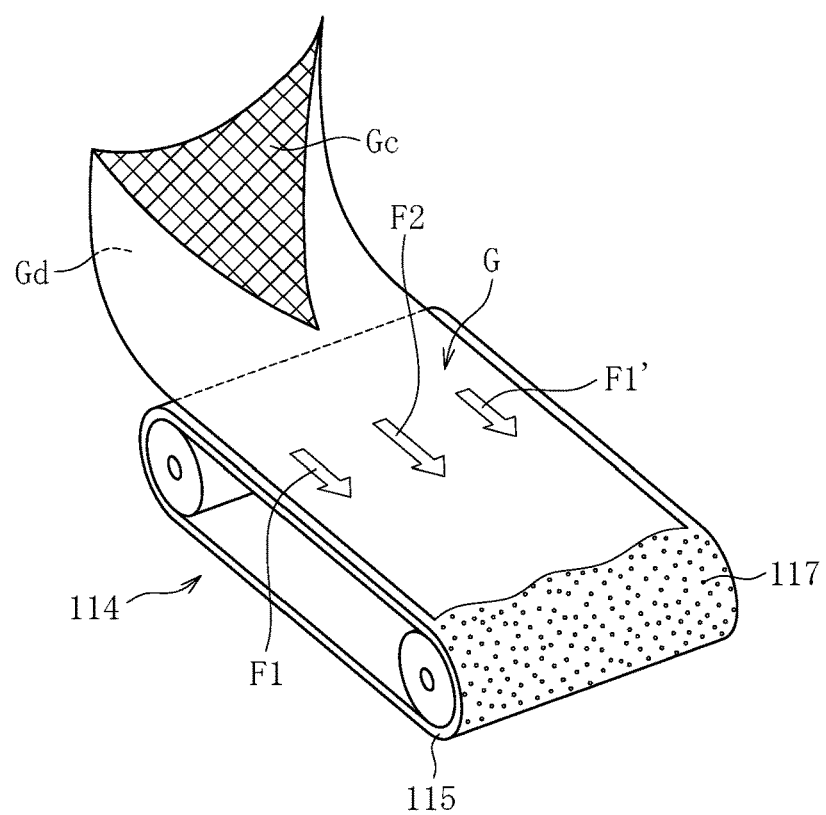
FIG. 4 is a main-part perspective view for schematically illustrating a distribution of the conveyance force, which is given to a band-shaped glass by a conveyor belt in the width direction when the band-shaped glass is conveyed by a related-art conveyor belt.

Now, consideration is given of a width direction distribution of the conveyance forces in the horizontal direction given to the band-shaped glass G by the conveyor belt 14 serving as the horizontal conveyance part 7. FIG. 4 schematically shows a distribution condition in the width direction of the above-mentioned conveyance propulsions in a case in which the band-shaped glass G is conveyed in the horizontal direction with a related-art conveyor belt 114 which is prepared for comparison with the present invention. This conveyor belt 114, similarly to the conveyor belt 14 according to the present invention, comprises an endless belt 115 in contact with the band-shaped glass G, and a large number of hole portions 117 formed in the endless belt 115. However, unlike the conveyor belt 14 according to the present invention, a part (a part in contact with both sides in the width direction of the band-shaped glass G) of the large number of hole portions 117 formed at the endless belt 115 is not closed. Therefore, along with the conveyance of the band-shaped glass G, when air (not shown) is jetted upwardly and supplied from an air supply device (not shown), the band-shaped glass G receives an upward buoyancy as a whole. However, it is difficult to control a magnitude of the buoyancy between a center in the width direction and both sides in the width direction, or between one side in the width direction and another side in the width direction. Thus, the conveyance propulsion in the horizontal direction given to the band-shaped glass G through the contact with the endless belt 115 does not become stable, and, for example, as illustrated in FIG. 4, conveyance propulsions (first propulsions F1 and F1') in the horizontal direction given to one side in the width direction or another side in the width direction is smaller than a conveyance propulsion (second propulsion F2) in the horizontal direction given to the center in the width direction of the band-shaped glass G in some cases. With the configuration described above, a condition of a curved deformation of the band-shaped glass G does not become stable, and, for example, as illustrated in FIG. 4, the curved deformation of the band-shaped glass G in an unfavorable orientation before the change in direction, more specifically, there is a fear in that the curved deformation, which a first main surface Gc facing upward during the horizontal direction conveyance protrudes and a second main surface Gd facing downward during the horizontal direction conveyance recesses may occur.

Figure 3:
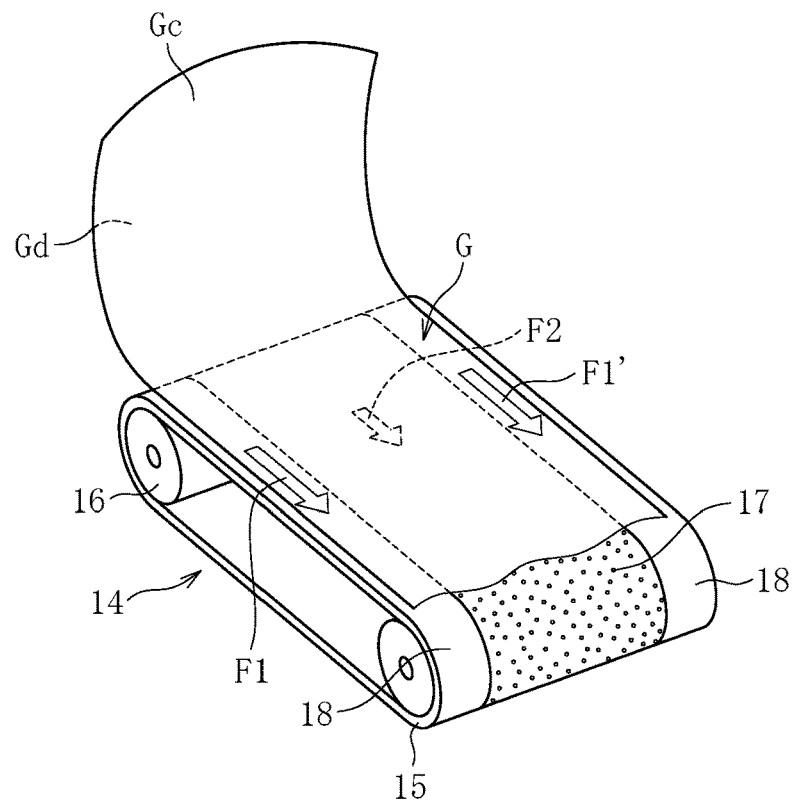
FIG. 3 is a main-part perspective view for schematically illustrating a distribution of a conveyance force, which is given to a band-shaped glass by a conveyor belt in a width direction when the band-shaped glass is conveyed by the conveyor belt according to the present invention.

Meanwhile, with the horizontal conveyance part 7 of the present invention (floating type conveyor belt 14), as illustrated in FIG. 2 and FIG. 3, a structure having no hole portions 17 for jetting gas in the portion of the endless belt 15 in contact with both sides in the width direction of the band-shaped glass G is adopted, and hence both sides in the width direction of the band-shaped glass G reliably come into contact with the endless belt 15. Meanwhile, with regard to the center in the width direction of the band-shaped glass G, by being jetted and supplied the air V upward through the hole portions 17 in the endless belt 15, the band-shaped glass G can be conveyed in the horizontal direction under a state in which the band-shaped glass G floats above the conveyor belt 14. Thus, as illustrated in FIG. 2 and FIG. 3, the band-shaped glass G can be conveyed in the horizontal direction while the band-shaped glass G is conveyed in the horizontal direction in a flat posture without a curve as a whole and the conveyance propulsions (first propulsions F1 and F1') are given in the horizontal direction having the same magnitude of both sides in the width direction of the band-shaped glass G by the conveyor belt 14. Further, the second propulsion F2 given to the center in the width direction of the band-shaped glass G by the conveyor belt 14 is substantially zero, and hence the first propulsion F1(F1') can be made reliably larger than the second propulsion F2.

As described above, when the conveyance propulsion in the horizontal direction given to the band-shaped glass G by the conveyor belt 14 can be distributed in the predetermined mode in the width direction, the curved deformation (curved deformation illustrated in FIG. 4) in the unfavorable orientation of the band-shaped glass G introduced to the direction changing part 6 can be prevented. Further, when it comes to the conveyance propulsion (first propulsions F1 and F1', second propulsion F2) in the horizontal direction given to the band-shaped glass G by the horizontal conveyance part 7, the width direction distribution can be relatively easily adjusted by simply changing the support configuration and the structure of the horizontal conveyance part 7. As described above, according to the manufacturing method of the present invention, while the stress concentration of the band-shaped glass G, which may occur during the change indirection, can be easily and effectively suppressed, thereby being capable of preventing the breakage of the band-shaped glass G.

Furthermore, as in the embodiment described above, with the configuration in which the hole portions 17 of the large number of hole portions 17 formed in the endless belt 15, which are formed at a portion in contact with both sides in the width direction of the band-shaped glass G, are closed by the tapes 18 (more preferably, the tapes 18 having a higher frictional force with respect to the band-shaped glass G than that of the endless belt 15), the first propulsions F1 and F1' given to both sides in the width direction of the band-shaped glass G can further be improved. In this manner, a difference between the second propulsion F2 and the first propulsions F1 and F1' is increased, a curved deformation in the opposite orientation with the curved deformation in the unfavorable orientation illustrated in FIG. 4, that is, as illustrated in FIG. 3, the curved deformation such that the first main surface Gc facing upward during the horizontal direction conveyance recesses and the second main surface Gd facing downward during the horizontal direction conveyance protrudes with respect to the band-shaped glass G during descending can be actively caused. Therefore, the curved deformation of the band-shaped glass G in the unfavorable orientation as illustrated in FIG. 4 can be reliably prevented.

The band-shaped glass G, in which the conveyance force in the horizontal direction is given by the horizontal conveyance part 7, is taken up into a roll shape by the take-up part 8, which is located on a downstream side in the conveyance direction of the band-shaped glass G with respect to the horizontal conveyance part 7 (see FIG. 1). Furthermore, the band-shaped glass G is cut along the width direction by the cutting part 9, which is located on the upstream side of the conveyance direction of the band-shaped glass G with respect to the take-up part 8. A glass film roll Gr can be obtained by taking the band-shaped glass G into a roll shape.

In the above, the first embodiment of the present invention has been described. However, as a matter of course, the manufacturing method and the manufacturing device 1 for a band-shaped glass described above may have any suitable configuration within the scope of the present invention.

Figure 5:
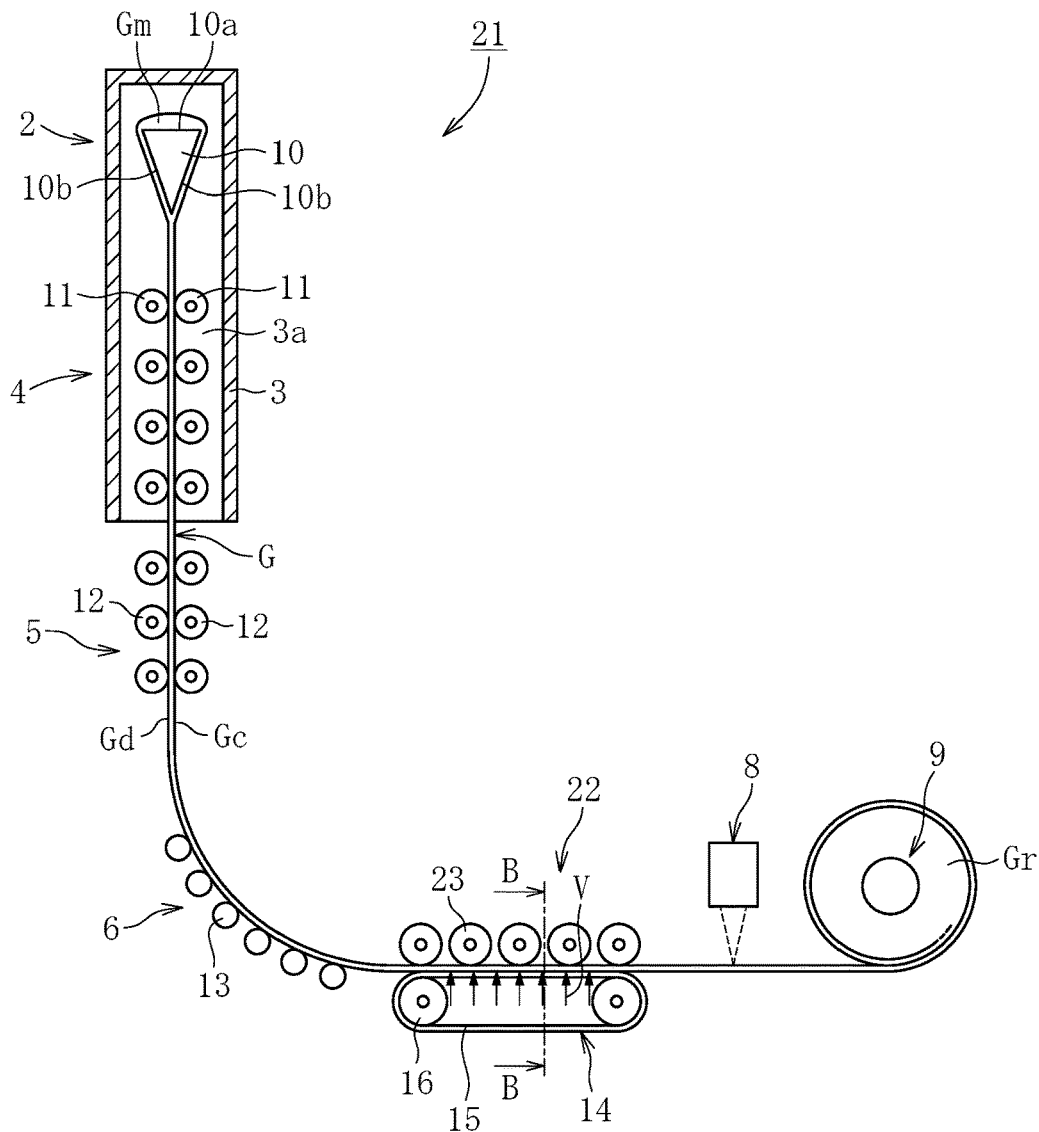
FIG. 5 is a longitudinal sectional view of a manufacturing device for a band-shaped glass according to a second embodiment of the present invention.

FIG. 5 is a longitudinal sectional view of a manufacturing device 21 for a band-shaped glass according to a second embodiment of the present invention. The manufacturing device 21 has a configuration that is different from the manufacturing device 1 of the first embodiment with regard to a horizontal conveyance part 22.

Figure 6:
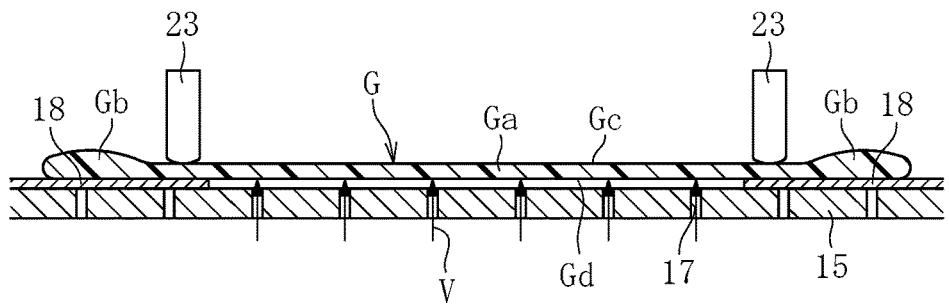
FIG. 6 is a main-part sectional view for illustrating the manufacturing device illustrated in FIG. 5, taken along the line B-B of FIG. 5.

To describe in detail, in this embodiment, the horizontal conveyance part 22 comprises the floating type conveyor belt 14 and one or a plurality of pairs of the nipping rollers 23 and 23 (five pairs in FIG. 5). The nipping rollers 23 and 23 are located on an upper part of the conveyor belt 14 and are capable of nipping the band-shaped glass G with the conveyor belt 14. The one or a plurality of pairs of the nipping rollers 23 and 23, as illustrated in FIG. 6, are each arranged apart from each other in the width direction by a predetermined distance so as to be capable of nipping both sides in the width direction of the band-shaped glass G introduced on the endless belt 15. Furthermore, in consideration that a vertical direction separation distance between the endless belt 15 (belt conveyor 14) and the nipping rollers 23 and 23 affects a nipping force of the band-shaped glass G, it is desired that, for example, the configuration be such that a vertical direction position of each of the one or plurality of those nipping rollers 23 and 23 be adjustable. As a matter of course, for the purpose of adjusting the nipping force more actively, the configuration may be such that those nipping rollers 23 and 23 can be pressurized downward and the downward pressing force is adjustable.

Furthermore, in this embodiment, as illustrated in FIG. 6, over the tapes 18 attached to both sides in the width direction of the endless belt 15, the above-mentioned nipping rollers 23 and 23 are arranged, and the nipping rollers 23 and 23 are configured to press both sides in the width direction of the band-shaped glass G over the tapes 18 and 18, respectively. In addition, in this embodiment, the above-mentioned rollers 23 and 23 are arranged at positions such that the nipping rollers 23 and 23 and the tapes 18 and 18 are respectively capable of nipping a region of both sides in the width direction of the band-shaped glass G in which the edge portions Gb having a large thickness dimension compared to the flat portion Ga is excluded. In other words, the positions in the width direction of the nipping rollers 23 and 23 are set so that portions that are close to the edge portions Gb of the flat portion Ga of the band-shaped glass G are nipped with the above-mentioned nipping rollers 23 and 23 and the tapes 18 and 18, respectively.

As described above, according to the horizontal conveyance part 22 of this embodiment, while both sides in the width direction of the band-shaped glass G are nipped, the conveyance propulsions (first propulsions F1 and F1' illustrated in FIG. 3) in the horizontal direction with respect to both sides in the width direction can be actively given. As a result, the first propulsions F1 and F1' given to both sides in the width direction of the band-shaped glass G can be further enhanced, the above-mentioned curved deformation in the unfavorable orientation of the band-shaped glass G can be prevented more reliably. As a matter of course, the band-shaped glass G is conveyed in the horizontal direction while the band-shaped glass G is nipped with the conveyor belt 14 and the nipping rollers 23. Therefore, there is no need to worry about hindering a smooth conveyance of the band-shaped glass G in the horizontal direction.

Furthermore, with the structure that the tapes 18 and 18 attached to the endless belt 15 and the nipping rollers 23 and 23 nip both sides in the width direction of the band-shaped glass G (see FIG. 6), both sides in the width direction of the band-shaped glass G can be nipped more firmly. As a result, larger conveyance propulsions (first propulsions F1 and F1') in the horizontal direction with respect to both sides in the width direction of the band-shaped glass G can be given, and hence the curved deformation in the unfavorable orientation of the band-shaped glass G can be further prevented with high probability.

In addition, in this embodiment, portions on both sides in the width direction of the band-shaped glass G that belong to the flat portion Ga are set to be nipped with the nipping rollers 23 and 23 and the endless belt 15, respectively. As described above, while avoiding the edge portions Gb that the thickness dimension is not stable and nipping the flat portion Ga that has a constant thickness dimension, the nipping condition of the band-shaped glass G is stabilized. Therefore, the magnitude of the first propulsions F1 and F1' given to the band-shaped glass by nipping can be stabilized, and hence the curved deformation in the unfavorable orientation of the band-shaped glass G can be prevented more stably and more reliably.

Further, in the above-mentioned embodiment, the case in which both sides in the width direction of the band-shaped glass G are nipped with the endless belt 15 and the nipping rollers 23 and 23 through the tapes 18 and 18 is given as an example (see FIG. 6). However, it is not essentially required to provide the tapes 18 and 18. Although an illustration is omitted, for example, both sides in the width direction of the band-shaped glass G may directly be nipped by the portion of the endless belt 15 that has no hole portion 17 and the nipping rollers 23 and 23.

Furthermore, in the above-mentioned embodiment, the case in which the hole portions 17 in the portion of the endless belt 15 in contact with both sides in the width direction of the band-shaped glass G is closed by attaching the tapes 18 and 18 is given as an example (see FIG. 2 and FIG. 6). As a matter of course, means other than the tapes 18 and 18 may be used to close the hole portions 17 in the portion in contact with both sides in the width direction of the band-shaped glass G. Alternatively, the endless belt 15 originally does not have the hole portions 17 in the portion in contact with both sides in the width direction of the band-shaped glass G and has the hole portions 17 in a portion other than the portion in contact with both sides in the width direction may be prepared.

In addition, in the above-mentioned embodiment, as means to enhance the conveyance propulsions (mainly the first propulsions F1 and F1') in the horizontal direction with respect to the band-shaped glass G, the case in which the tapes 18 and 18 having a higher frictional force with respect to the band-shaped glass G than that of the endless belt 15 are attached to the endless belt 15 is given as an example. However, means for increasing the conveyance propulsion is not limited to this. Although an illustration is omitted, for example, by preparing the endless belt 15 having no hole portion 17 in the portion in contact with both sides in the width direction of the band-shaped glass G and performing a rough surface treatment on the portion having no hole portion 17, the first propulsions F1 and F1' can be enhanced.

Further, in the above-mentioned embodiment, the case in which the horizontal conveyance part 7 comprises the endless belt 15 having the width direction dimension larger than that of the band-shaped glass G and serves as the conveyor belt 14 which is capable of supporting both sides in the width direction of the band-shaped glass G with the endless belt 15 is given as an example, but as a matter of course, the horizontal conveyance part 7 is not limited to this. For example, although illustration is omitted, the horizontal conveyance part 7 may comprise a conveyor belt configured to support both sides in the width direction of the band-shaped glass G and a free roller configured to support the center in the width direction of the band-shaped glass G. Alternatively, in place of the above-mentioned conveyor belt, the horizontal conveyance part 7 may adopt a configuration that a roller, which is driven to rotate, supports both sides in the width direction of the band-shaped glass G. Alternatively, in place of the above-mentioned free roller, a surface plate may be arranged at the center in the width direction of the band-shaped glass G, and the air V (see FIG. 2) may be jetted upward to supply the air from a plurality of slits, hole portions, or the like formed on the surface plate.

Alternatively, when a warp of the band-shaped glass G by its own weight occurs within an allowable level, for example, although illustration thereof is omitted, it is possible to adopt a configuration that ordinary conveyor belts, which are not a floating type, are arranged only at portions in contact with both sides in the width direction of the band-shaped glass G, and the nipping rollers 23 and 23 as illustrated in, for example, in FIG. 5 are arranged above the one pair of the conveyor belt, respectively.

Furthermore, it is desired that a magnitude of the first propulsion F1 given to one side in the width direction of the band-shaped glass G by the horizontal conveyance part 7 and a magnitude of the first propulsion F1' given to another side in the width direction of the band-shaped glass G by the horizontal conveyance part 7 be equal to each other. However, depending on the magnitude of each of the first propulsions F1 and F1', the magnitude of the first propulsions F1 and F1' may be different from each other.

Further, in the description described above, the case in which the present invention is applied when the band-shaped glass G is formed through the overflow down-draw method is given as an example. However, as a matter of course, the present invention is not limited to this case. The present invention can be applied to a case in which the band-shaped glass G is formed through a down-draw method other than the overflown down-draw method, such as a slot down-draw method and a re-draw method.

The invention claimed is:

1. A manufacturing method for a band-shaped glass, the manufacturing method comprising:
    a forming step of forming a band-shaped glass;
    an annealing step of performing an annealing treatment on the band-shaped glass;
    a cooling step of cooling the band-shaped glass having been subjected to the annealing treatment;
    a direction-changing step of changing a movement direction of the band-shaped glass having been cooled from a vertical direction or a direction forming a certain angle with respect to the vertical direction to a horizontal direction; and
    a horizontal conveying step of conveying the band-shaped glass having been changed in direction to the horizontal direction while supporting the band-shaped glass at a horizontal conveyance part,
    wherein the horizontal conveyance part is a floating belt conveyor having a belt, which causes at least a part of the band-shaped glass in a width direction to float from the belt by jetting air upward from a hole portion having at least one hole that is opened on the belt,
    wherein a tape is attached to a portion of the belt that is in contact with both of the sides of the band-shaped glass in the width direction of the band-shaped glass, and any holes in the portion of the belt that is in contact with both of the sides of the band-shaped glass in the width direction are closed by the tape,
    wherein, in the horizontal conveying step, the band-shaped glass is conveyed in the horizontal direction while a first propulsion for driving a conveyance in the horizontal direction is given to both sides of the band-shaped glass in a width direction of the band-shaped glass by the floating belt conveyor, and
    wherein a second propulsion for driving conveyance in the horizontal direction given to a center of the band-shaped glass in the width direction of the band-shaped glass is zero.

2. The manufacturing method for a band-shaped glass according to claim 1, wherein the horizontal conveyance part comprises the floating belt conveyor and a nipping roller, which is located above the floating belt conveyor and is configured to nip both of the sides of the band-shaped glass in the width direction of the band-shaped glass with the belt.

3. The manufacturing method for a band-shaped glass according to the claim 2,
    wherein the band-shaped glass comprises a flat portion having a constant thickness dimension in the width direction, the thickness dimension including the center of the band-shaped glass in the width direction, and edge portions which are located on opposite outer sides of the flat portion in the width direction, the edge portions having a thickness dimension larger than that of the flat portion, and
    wherein a region of each of the sides of the band-shaped glass in the width direction of the band-shaped glass in which the edge portion is excluded is nipped with the nipping roller and the belt.

4. The manufacturing method for a band-shaped glass according to claim 1, wherein the tape has a higher frictional force with respect to the band-shaped glass than the belt.

5. The manufacturing method for a band-shaped glass according to claim 4,
    wherein the horizontal conveyance part comprises the floating belt conveyor and a nipping roller, which is located above the tape, and
    wherein, when both of the sides of the band-shaped glass in the width direction of the band-shaped glass are pressed through use of the nipping roller from above the tape, both of the sides of the band-shaped glass in the width direction of the band-shaped glass are nipped with the nipping roller and the belt through the tape.

6. The manufacturing method for a band-shaped glass according to claim 1,
    wherein the horizontal conveyance part comprises the floating belt conveyor and a nipping roller, which is located above the tape, and
    wherein, when both of the sides of the band-shaped glass in the width direction of the band-shaped glass are pressed through use of the nipping roller from above the tape, both of the sides of the band-shaped glass in the width direction of the band-shaped glass are nipped with the nipping roller and the belt through the tape.

7. The manufacturing method for a band-shaped glass according to the claim 6, wherein the band-shaped glass comprises a flat portion having a constant thickness dimension in the width direction, the thickness dimension including the center of the band-shaped glass in the width direction, and edge portions which are located on opposite outer sides of the flat portion in the width direction, the edge portions having a thickness dimension larger than that of the flat portion, and wherein a region of each of the sides of the band-shaped glass in the width direction of the band-shaped glass in which the edge portion is excluded is nipped with the nipping roller and the belt.

\* \* \* \* \*